US010620041B2

(12) United States Patent
Tiwari et al.

(10) Patent No.: US 10,620,041 B2
(45) Date of Patent: Apr. 14, 2020

(54) ELECTRONIC DEVICE AND METHOD FOR PROVIDING INFORMATION OF UV DOSE THEREOF

(71) Applicant: SAMSUNG ELECTRONICS CO., LTD., Suwon-si (KR)

(72) Inventors: Vijay Narayan Tiwari, Bangalore (IN); Soumyabrata Dey, Bangalore (IN); Saswata Sahoo, Bangalore (IN); Rangavittal Narayanan, Bangalore (IN); Aloknath De, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 165 days.

(21) Appl. No.: 15/709,049

(22) Filed: Sep. 19, 2017

(65) Prior Publication Data
US 2018/0080818 A1    Mar. 22, 2018

(30) Foreign Application Priority Data

Sep. 19, 2016  (IN) .............................. 201641031912

(51) Int. Cl.
*G01J 1/02*  (2006.01)
*G01J 1/42*  (2006.01)

(52) U.S. Cl.
CPC ............ *G01J 1/4209* (2013.01); *G01J 1/0219* (2013.01); *G01J 1/0228* (2013.01); *G01J 1/0242* (2013.01); *G01J 1/4204* (2013.01); *G01J 1/429* (2013.01); *G01J 2001/4266* (2013.01)

(58) Field of Classification Search
CPC ... G01J 1/429; G01J 1/4204; G01J 2001/4266
See application file for complete search history.

(56) References Cited

U.S. PATENT DOCUMENTS

| 2007/0108389 | A1  | 5/2007 | Makela et al. |
| 2012/0170284 | A1* | 7/2012 | Shedletsky ......... G02F 1/13318 362/355 |
| 2015/0070337 | A1  | 3/2015 | Bell et al. |
| 2015/0177063 | A1* | 6/2015 | Lian ..................... G01J 1/0403 250/372 |

(Continued)

FOREIGN PATENT DOCUMENTS

| DE | 10 2008 036 652 A1 | 2/2010 |
| WO | 2013/034288 A1 | 3/2013 |

OTHER PUBLICATIONS

"Apple Previews iOS 9", Press Release, Jun. 8, 2015, Apple Inc., (4 Pages Total).

(Continued)

*Primary Examiner* — Thanh Luu
(74) *Attorney, Agent, or Firm* — Sughrue Mion PLLC

(57) ABSTRACT

An electronic device for determining an ultraviolet (UV) dose includes a memory, at least one non-UV sensor, a display, and a processor, coupled to the memory, the at least one non-UV sensor, and the display. The processor is configured to determine a context of the electronic device, obtain information of ambient light using one or more parameter sensed by the light sensor, estimate an ultraviolet (UV) dose based on the context of the electronic device and the information of ambient light, and control the display to output information of the UV dose.

16 Claims, 19 Drawing Sheets

(56) References Cited

U.S. PATENT DOCUMENTS

2015/0346024 A1\* 12/2015 Hingorani ............. G01J 1/4204
   250/208.2
2016/0041035 A1\* 2/2016 Allen .................... G01J 1/0233
   356/402
2016/0048954 A1 2/2016 Cho et al.

OTHER PUBLICATIONS

International Search Report issued by the International Searching Authority dated Jan. 10, 2018 in counterpart International Patent Application No. PCT/KR2017/010244 (PCT/ISA/210).
Written Opinion issued by the International Searching Authority dated Jan. 10, 2018 in counterpart International Patent Application No. PCT/KR2017/010244 (PCT/ISA/237).
Communication dated Jun. 5, 2019, issued by the European Patent Office in counterpart European Application No. 17851145.7.

\* cited by examiner

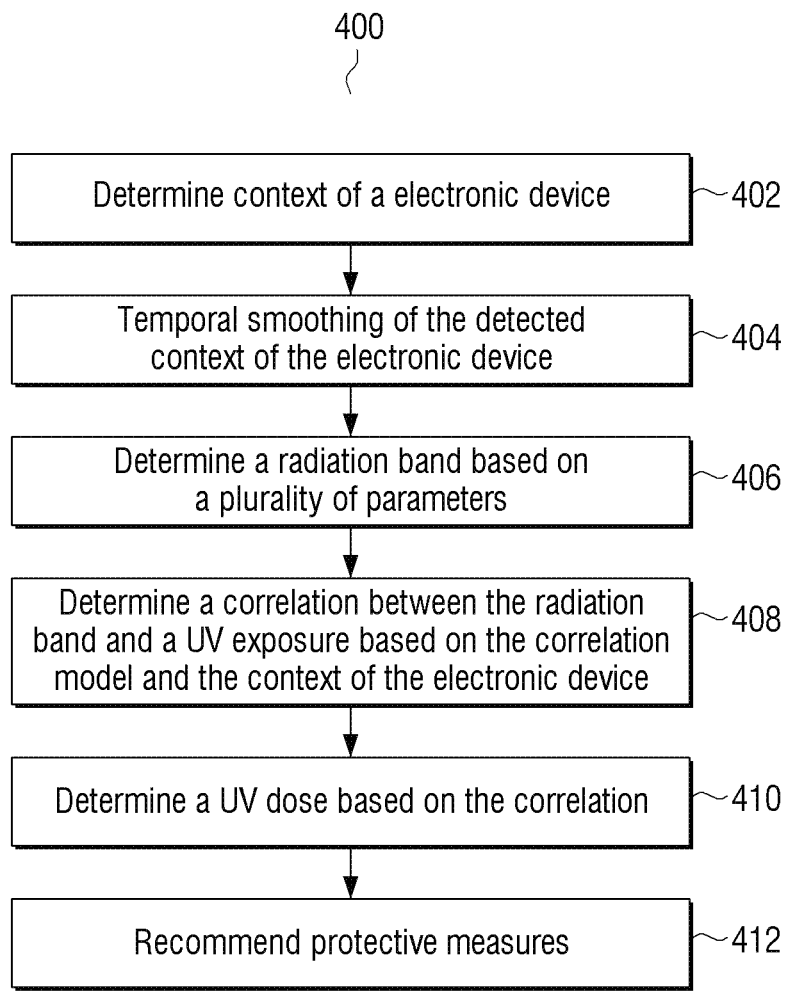

ELECTRONIC DEVICE AND METHOD FOR PROVIDING INFORMATION OF UV DOSE THEREOF

CROSS-REFERENCE TO RELATED APPLICATIONS

This application claims the priority from Indian Patent Application No. 201641031912, filed on Sep. 19, 2016, in the Indian Intellectual Property Office, the entire disclosure of which is herein incorporated by reference.

BACKGROUND

1. Technical Field

Apparatuses and methods consistent with example embodiments herein relate to ultraviolet (UV) exposure detecting devices and methods, and more particularly, to an electronic device and a method for estimating cumulative UV exposure using a non-UV sensor.

2. Description of the Related Art

Electronic device based personalized health monitoring and recommendation applications for electronic devices (e.g., smart phones, wearable devices, etc.), such as an application to measure UV exposure, are gaining popularity. The UV exposure and/or UV intensity can be measured using a UV sensor integrated to an electronic device. However, integrating such UV sensors designed to measure the UV exposure and/or UV intensity may increase the overall cost of the electronic device. Moreover, it may not be desirable for a user to purchase a new electronic devices or UV sensors for the purpose of estimating the UV exposure and/or UV intensity.

Further, some related art mechanisms for measuring UV exposure and/or UV intensity may restrict the electronic device or UV sensor to be oriented at a particular direction to obtain an accurate estimation of the UV exposure and/or UV intensity. This may make the measurement process more tedious for the user and may degrade the overall user experience.

SUMMARY

One or more example embodiments provide a method and electronic device for determining an ultraviolet (UV) dose using at least one non-UV sensor.

One or more example embodiments also provide an electronic device for determining the UV dose based on a radiation band and a correlation model, wherein the UV dose is measured independent of an orientation of the electronic device.

One or more example embodiments also provide an electronic device for outputting the UV dose.

One or more example embodiments also provide an electronic device for determining a context of the electronic device.

One or more example embodiments also provide an electronic device for determining a radiation band based on a plurality of parameters.

One or more example embodiments also provide an electronic device for determining a correlation between the radiation band and a UV exposure based on the correlation model and the context of the electronic device.

One or more example embodiments also provide an electronic device for determining the UV dose based on the correlation.

One or more example embodiments also provide an electronic device for determining the UV dose invariant to the orientation of the electronic device with respect to a direction of a source of UV radiation.

One or more example embodiments also provide an electronic device for determining a cumulative UV exposure.

One or more example embodiments also provide a method for recommending protective measures based on the UV dose.

According to an aspect of an example embodiment, there is provided an electronic device including a light sensor; a display; and a processor configured to: determine a context of the electronic device, obtain information of ambient light using one or more parameters sensed by the light sensor, estimate an ultraviolet (UV) dose based on the context of the electronic device and the information of ambient light, and control the display to display information of the UV dose.

The processor may be further configured to determine a correlation model to estimate the UV dose based on the context of the electronic device.

The context of the electronic device may include information on whether the electronic device is positioned indoors and information on weather of a region where the electronic device is positioned.

The processor may be further configured to: determine whether the electronic device is positioned indoors or outdoors, in response to determining that the electronic device is positioned indoors, select a first correlation model, and in response to determining that the electronic device is positioned outdoors, determine weather information of the region where the electronic device is positioned and select a second correlation model based on the weather information.

The information on the ambient light may include information on a radiation band of the ambient light.

The electronic device may include a sensor configured to sense a position of the electronic device, wherein the processor is further configured to: obtain an angular difference between the electronic device and the UV rays source based on the position of the electronic device sensed by the sensor and obtain information of the radiation band of the ambient light based on the angular difference and orientation invariant lux obtained by the light sensor.

The processor may be further configured to: determine correlation between a radiation band of the ambient light and UV rays based on the correlation model, and estimate the UV dose based on the correlation model.

The processor may be further configured to: obtain information of a skin type of a user, and control the display to provide information of a personalized UV dose based on the information of the UV dose and the skin type.

According to another aspect of an example embodiment, there is provided there is provided a method of estimating an ultraviolet (UV) dose of an electronic device, the method including: determining a context of the electronic device; obtaining information of ambient light using one or more parameters sensed by a light sensor; estimating a UV dose based on the context of the electronic device and the information of ambient light; and displaying information of the UV dose.

The estimating the UV dose may include determining a correlation model to estimate the UV dose based on the determined context of the electronic device.

The context of the electronic device may comprise information on whether the electronic device is positioned indoors and information on weather of a region where the electronic device is positioned.

The determining the correlation model may include: determining whether the electronic device is positioned indoors or outdoors; in response to determining that the electronic device is positioned indoors, selecting a first correlation model; and in response to determining that the electronic device is positioned outdoors, determining weather information of a region where the electronic device is positioned and selecting a second correlation model based on the determined weather information.

The information on the ambient light may include information on a radiation band of the ambient light.

Obtaining the information of ambient light may include: obtaining an angular difference between the electronic device and a UV source based on a sensed position of the electronic device; and obtaining information of the radiation band of the ambient light based on the angular difference and orientation invariant lux obtained by the light sensor.

Estimating the UV dose may include: determining correlation between a radiation band of the ambient light and UV rays based on the correlation model; and estimating UV dose based on the determined correlation.

The method may further include: obtaining information of a skin type of a user; and displaying information of personalized UV exposure based on the estimated UV dose and the information of the skin type According to another aspect of an example embodiment an electronic device may include: a light sensor configured to sense ambient light; a display; and a processor configured to: determine a context of the electronic device, obtain an orientation invariant lux of the ambient light based on one or more parameters of the ambient light sensed by the light sensor, estimate an ultraviolet (UV) dose based on the context of the electronic device and the orientation invariant lux, and control the display to display the UV dose.

The processor may be further configured to determine a lux measurement model to estimate the UV dose based on the context of the electronic device and the orientation invariant lux.

The electronic device may determine a correlation between the orientation invariant lux and an ultraviolet intensity (UVI) is determined based on a lux measurement model.

The processor may be further configured to estimate the UV dose is based on the correlation and the context of the electronic device.

BRIEF DESCRIPTION OF DRAWINGS

The above and/or other aspects will become apparent and more readily appreciated from the following detailed description of example embodiments, taken in conjunction with the accompanying drawings, in which:

FIG. 4 illustrates a flowchart illustrating a method for recommending protective measures based on a UV dose according to an example embodiment;

DETAILED DESCRIPTION

Figure 1:
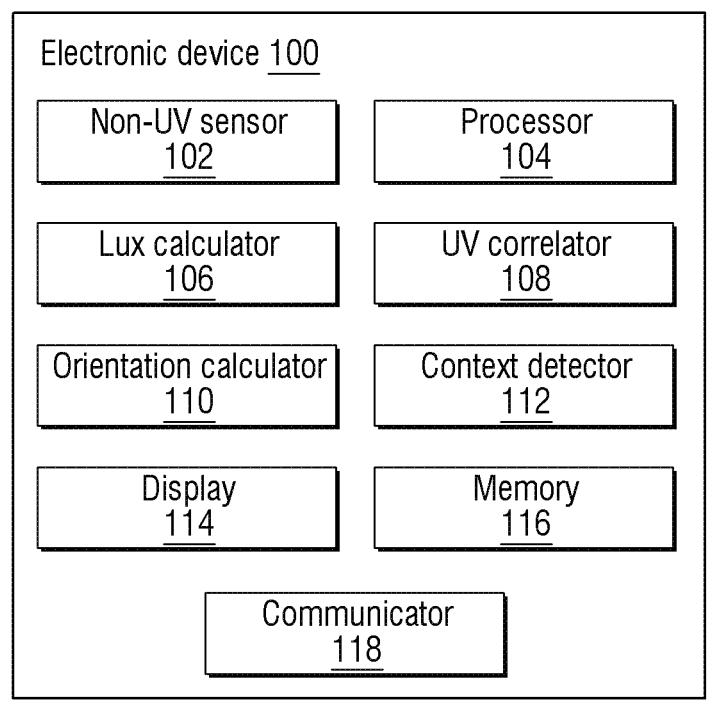
FIG. 1 illustrates a block diagram of an electronic device for determining a UV dose using at least one non-UV sensor according to an example embodiment.

Hereinafter, various example embodiments of the present disclosure will now be described in detail with reference to the accompanying drawings. In the following description, specific details such as detailed configuration and components are merely provided to assist the overall understanding of the example embodiments of the present disclosure. Therefore, it should be apparent to those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some example embodiments can be combined with one or more other example embodiments to form new example embodiments.

The terms used in the present specification are used for the purpose of describing the example embodiments, and not for the purpose of limiting and/or restricting the present disclosure.

Throughout the disclosure, the terms used are merely used to describe example embodiments, and are not intended to limit the present disclosure. As used herein, the singular forms "a," "an" and "the" are intended to include the plural forms as well, unless the context clearly indicates otherwise. Also, it is to be understood that the terms such as "include," "have," etc., are intended to indicate the existence of the features, numbers, operations, steps, components, parts, or combinations thereof in the present disclosure, and are not intended to preclude the possibility that one or more other features, numbers, operations, steps, components, parts, or combinations thereof may exist or may be added. The term "or" as used herein, refers to a non-exclusive or, unless otherwise indicated.

The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

Example embodiments may be described and illustrated in terms of blocks which carry out a described function or functions. These blocks may be physically implemented by analog and/or digital circuits such as logic gates, integrated circuits, microprocessors, microcontrollers, memory circuits, passive electronic components, active electronic components, optical components, hardwired circuits, or the like, and may optionally be driven by firmware or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks. Likewise, the blocks of the example embodiments may be physically combined into more complex blocks.

The example embodiments herein relate to an electronic device for determining a UV dose. The electronic device may include a memory, at least one non-UV sensor, and a processor coupled to the at least one non-UV sensor. The processor may be configured to measure the UV dose based on a radiation band and a correlation model, wherein the UV dose is measured independent of an orientation of the electronic device, and the processor may be configured to cause the measured UV dose to be output.

According to an example embodiment, the electronic device may determine the UV dose using at least one non-UV sensor irrespective of an orientation of the electronic device with respect to a source of UV radiation. The electronic device may determine the UV dose using sensors included in the electronic device (e.g., accelerometer, magnetometer, light sensor, or the like), so additional hardware such as a UV sensor may not be required. Thus providing a more cost effective system for measuring the UV dose.

Further, in the related art, to obtain a more accurate estimation of the UV exposure, an electronic device with the UV sensor had to be oriented at a specific direction in relation to the incident UV radiation, which could limit user experience when determining the UV dose. However, according to example embodiments, the electronic device may determine the UV dose invariant to the orientation of the electronic device with respect to a direction of UV radiation, which may improve user experience.

Furthermore, according to example embodiments, the electronic device may determine the cumulative UV dose for a period of time.

According to example embodiments, the system may determine the UV dose in a scenario where multiple reflections occur from different surfaces (i.e., when a user is exposed to UV radiation on a beach and multiple reflections occur from water surface and sand surface). According to example embodiments, the electronic device may more accurately measure the UV dose under different climatic conditions (such as cloudy, partly cloudy, sunny and partly sunny) and with different positional scenarios (such as outdoor, indoor, semi-outdoor) of the electronic device.

Further, according to example embodiments, the electronic device may recommend protective measures based on the determined UV dose.

Referring to FIGS. 1 through 10, similar reference characters denote corresponding features consistently throughout the figures.

FIG. 1 illustrates a block diagram of an electronic device 100 for determining the UV dose according to an example embodiment. In an example embodiment, the electronic device 100 may be, for example, a mobile phone, Internet of Things (IoT) device, a smart phone, personal digital assistants (PDAs), a tablet, a phablet, a consumer electronic device, a dual display device, a wearable device, a data processing device, a machine to machine device, a laptop computer, or the like. The electronic device 100 may include at least one non-UV sensor 102, a processor 104, a lux calculator 106, a UV correlator 108, an orientation calculator 110, a context detector 112, a display 114, a memory 116, and a communicator 118.

The at least one non-UV sensor 102 may be, for example, an accelerometer, a magnetometer, a gyroscope, or a light sensor. The non-UV sensor 102 may be coupled to the processor 104.

For example, the at least one non-UV sensor may be a light sensor which may obtain information of the ambient light, and an accelerometer, a magnetometer, and a gyroscope which may obtain information of a current position of the electronic device.

The processor 104 may be, for example, a hardware unit, an apparatus, a central processing unit (CPU), a graphics processing unit (GPU) communicatively coupled to the memory 116 (e.g., a volatile memory and/or a non-volatile memory). The memory 116 may include storage locations configured to be addressable through the processor 104. Further, the memory 116 may include non-volatile storage elements. Examples of such non-volatile storage elements may include magnetic hard discs, optical discs, floppy discs, flash memories, forms of electrically programmable memories (EPROM), and electrically erasable and programmable (EEPROM) memories. In addition, the memory 116 may be considered a non-transitory storage medium. The term "non-transitory" may indicate that the storage medium is not embodied in a carrier wave or a propagated signal. However, the term "non-transitory" should not be interpreted as the memory 116 is non-movable. In certain examples, a non-transitory storage medium may store data that may change over time (e.g., in random access memory (RAM) or cache).

In an example embodiment, the processor 104 may be configured to determine the UV dose based on a radiation band and a correlation model, wherein the UV dose is measured independent of an orientation of the electronic device 100. The radiation band may include both UV light band and visible light band.

In an example embodiment, determining the UV dose based on the radiation band and the correlation model may include determining a context of the electronic device 100, determining the radiation band based on a plurality of parameters, determining a correlation between the radiation band and UV exposure based on the correlation model and the context of the electronic device 100, and determining the UV dose based on the correlation between the radiation band and UV exposure.

In an example embodiment, the correlation model may be an orientation invariant lux model. For example, the lux calculator 106 may compute the lux measurement model (i.e., the orientation invariant lux model) based on previously collected data sets (e.g., controlled data set and un-controlled data set). The controlled data set and un-controlled data set may be captured during a short time interval at a given time of a day. The controlled data (e.g., lux, UVI, orientation of the electronic device 100, elevation angle of the sun) may be captured by directing the non-UV sensor 102 towards the source of UV radiation, such as the sun, and by rotating the electronic device 100 at 360 degree angle. The uncontrolled data is captured by placing the electronic device 100 on an object (e.g., a human hand) for a shorter duration in arbitrary directions. In an example embodiment, the lux calculator 106 may measure ambient light intensity.

According to an example embodiment, the orientation of the electronic device 100 and the measured ambient light intensity may be set as a paired variable $(x_i, y_i)$, observed at i=1, 2 . . . n, where $x_i \in [0,\zeta]$ and n is a positive integer. The lux measurement model relates to the orientation of the electronic device 100 and the observed light intensity $y_i$ may be given by $y_i = f(x_i) + e_i$, where $e_i$ is an error value. The electronic device 100 estimates f(0) as the maximum light intensity exposure. Typically, based on observed pair of $(x_i, y_i)$s, off the shelf regression based estimates of f(0) may under-estimate the true f(0) as $x_i$s may not assume such values which produce maximum attainable $y_i$s. One information for correcting the bias may come from the maximum light intensity exposure based on the elevation angle given by the lux measurement model and is denoted as $f_0(0)$. In addition to this, the lux measurement model may implement a bootstrap bias correction strategy to correct the under estimation to come up with a more accurate estimate of f(0) as described in steps 1-4.

Step 1: Based on observed pair of $(x_i, y_i)$s, the statistical model estimates "f(x)" using local linear smoother and obtain an initial estimate of f(0) as shown in equation (1):

$$\hat{f}(0) = w(x_0)\hat{a} + (1-w(x_0))f_0(0) \quad (1)$$

where $$(\hat{a}, \hat{b}) = \text{ArgMin}_{a,b} \sum_{i}^{n} k_h(x_0 - x_i)(y_i - a - b(x_0 - x_i))^2, k_h(\cdot)$$

is a suitable kernel function with bandwidth h, $x_0 = \min\{x_i\}_i = 1, 2, 3 \ldots n$ and $w(\cdot)$ is a tuned monotonically decreasing weight function which controls the relative importance of the lux measurement model estimates $f_0(0)$ and data driven estimate â based on minimum attained angle $x_0$ in the observed dataset.

Step 2: The lux measurement model considers a bootstrap subsample of size m, (m<n) from $(x_i, y_i)_i = 1, 2, 3 \ldots n$ given by $$(x_i^*, y_i^*)_{i=1,2,\ldots m}^{(b)}.$$

Obtaining a bootstrap version of $f_0$ is explained in equation (3) as $f^{(b)}(0)$.

Step 3: The lux measurement model repeats the step 2 for b=1, 2, . . . , B, where B is a large enough number to get bootstrap replicates of f(0) as $\{\hat{f}^{(b)}(0), b=1, 2, 3, \ldots, B\}$.

Step 4: The bootstrap bias corrected estimate of f(0) is given by $$\hat{f}_{Boot}(0) = \hat{f}(0) + B^{-1}\sum_{b=1}^{B}|\hat{f}^{(b)}(0) - \hat{f}(0)|$$

In an example embodiment, for a given elevation angle of the sun and altitude of the sun, the lux calculator 106 may provide the expected value of orientation invariant lux.

In an example embodiment, the UV correlator 108 may determine a correlation between the lux and the UVI based on the lux measurement model and the context of the electronic device 100. For example, the UV correlator 108 may use a polynomial equation (2) to determine the correlation between the lux and the UVI. In an example embodiment, the polynomial equation may be a second order polynomial equation as shown in equation (2):

$$Y = a + bX + cX^2 \quad (2)$$

$a = 9.228e^{-1}; b = 5.573e^{-5}; c = -1.484e^{-10}$ where X is lux, and Y is UVI.

Figure 3A:
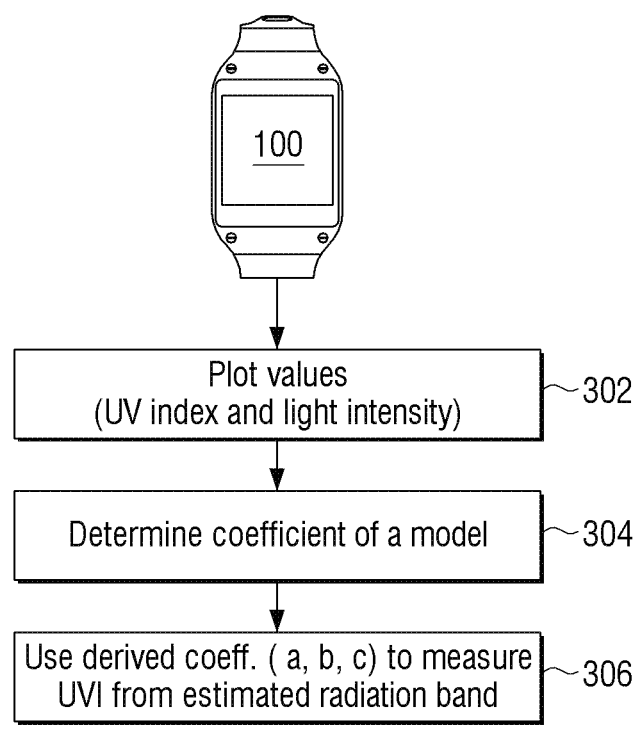
FIG. 3A illustrates a flow chart for determining ultraviolet index (UVI) from the lux values according to an example embodiment.
Figure 3B:
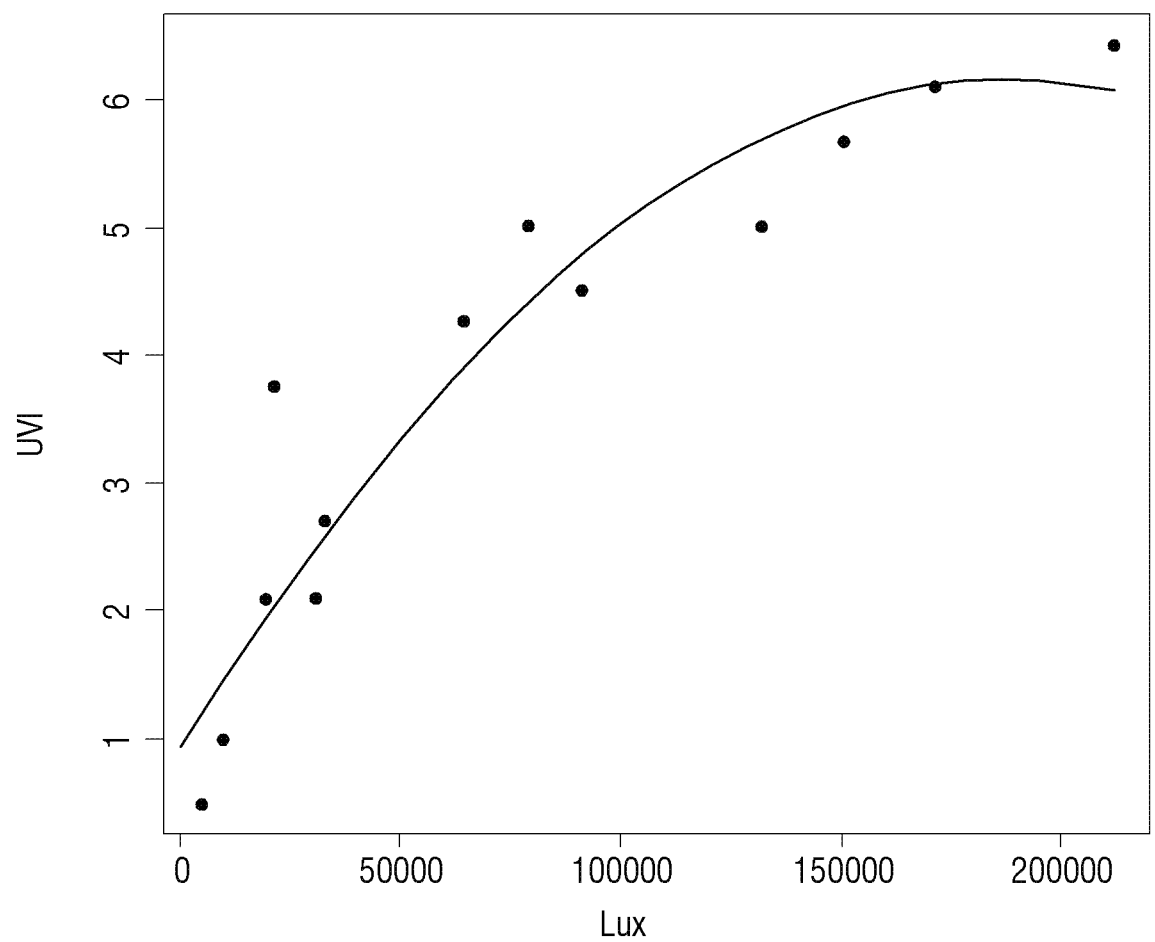
FIG. 3B illustrates a graph showing variation of lux values and UVI according to an example embodiment.

The correlation between the lux values and the UVI is explained in conjunction with FIGS. 3A and 3B.

In an example embodiment, the cumulative UV dose, as determined, is invariant to the orientation of the electronic device 100 with respect to a direction of the source of UV radiation (e.g., the sun).

In an example embodiment, the plurality of parameters may include at least one of an angular difference between the source of UV radiation and the electronic device 100, and an orientation invariant lux. In an example embodiment, the angular difference between the source of UV radiation and the electronic device 100 may be determined by the orientation calculator 110. The orientation calculator 110 determines the position of the source of UV radiation, such as the sun. For example, the orientation calculator 110 may determine (e.g., using "solaR" technique) the sun's position relative to earth's coordinate system. For a set of data such as latitude, date, and time, the orientation calculator 110 may determine (e.g., using 'fSoII' function of the "solaR" technique) the sun's azimuth angle and elevation angle. The position of the sun may be defined by the sun azimuth angle and elevation angle.

In an example embodiment, the orientation calculator 110 may determine the orientation of the electronic device 100. For example, the orientation calculator 110 may use sensor data fusion technique to determine the orientation of the electronic device 100. The sensor data fusion technique may include receiving data from the non-UV sensor 102 as input and providing roll angle, pitch angle, and azimuth angle of the electronic device 100 with respect to coordinates of the earth. Thus, the sun's position and the orientation of the electronic device 100 may be uniquely defined by two vectors with respect to the same coordinate system.

In an example embodiment, the orientation calculator 110 may determine an angular difference between the sun and the electronic device 100. As the sun's position and the orientation of the electronic device 100 can be uniquely defined by two vectors with respect to the same coordinate system, and an angular difference can be computed by estimating the angle between the two vectors. The computation of the angular difference is explained in conjunction with FIGS. 2A and 2B.

In an example embodiment, the context of the electronic device 100 may be determined based on at least one of weather condition (e.g., cloudy, partly cloudy, sunny, and very hot), light intensity threshold, location (e.g., outdoor, indoor, semi-outdoor, etc.), and based on at least one parameter from the plurality of parameters. The context detector 112 may be configured to determine the context of the electronic device 100. For example, the context of the electronic device 100 may be determined based on the at least one parameter from global positioning system (GPS) data, cell tower signal strength to which the electronic device 100 is connected, GPS signal strength, data from the non-UV sensor 102, weather condition, light intensity threshold, location, or the like. For example, the context of the electronic device 100 may be indoor, outdoor, or semi-outdoor. In relation to the context of the electronic device 100, semi-outdoor refers to a scenario when the electronic device is inside, for example, a movable vehicle. In an example embodiment, the context detector 112 may perform temporal smoothing of the context, to fix incorrectly detected context of the electronic device 100, in order to provide a more accurate UV exposure index. The determination of the context of the electronic device 100 is explained in conjunction with FIG. 5.

After determining the UV dose, the processor 104 may be configured to output the determined UV dose. In an example embodiment, the processor 104 may be configured to display the determined UV dose on the display 114. In an example embodiment, the processor 104 may be configured to provide an audio message related to the UV dose. For example, the audio message can be an alert, a notification, a recommendation, or the like. For example, the display 114 may be a cathode ray tube (CRT) display, a liquid crystal display (LCD), or a light-emitting diode (LED) display.

The communicator 118 may be configured for communication internally between the components within the electronic device and externally with external networks.

FIG. 1 shows a block diagram of the electronic device 100 according to an example embodiment, but example embodiments are not limited thereto. One or more block shown in the FIG. 1 may be combined together to form a block that has the same or substantially similar functions. Further, the electronic device 100 may include any number of blocks along with other hardware and software components communicating with each other interacting locally or remotely to estimate the UV does using the non-UV sensor(s). Both an application running on a device and the device itself may be a component.

In addition, the lux calculator 106, UV correlator 108, orientation calculator 110, and context detector 112 may be implemented within the processor 104, but this is merely exemplary, and each of the lux calculator 106, UV correlator 108, orientation calculator 110, and context detector 112 may be implemented as at least one processor separate from the processor 114.

Figure 2A:
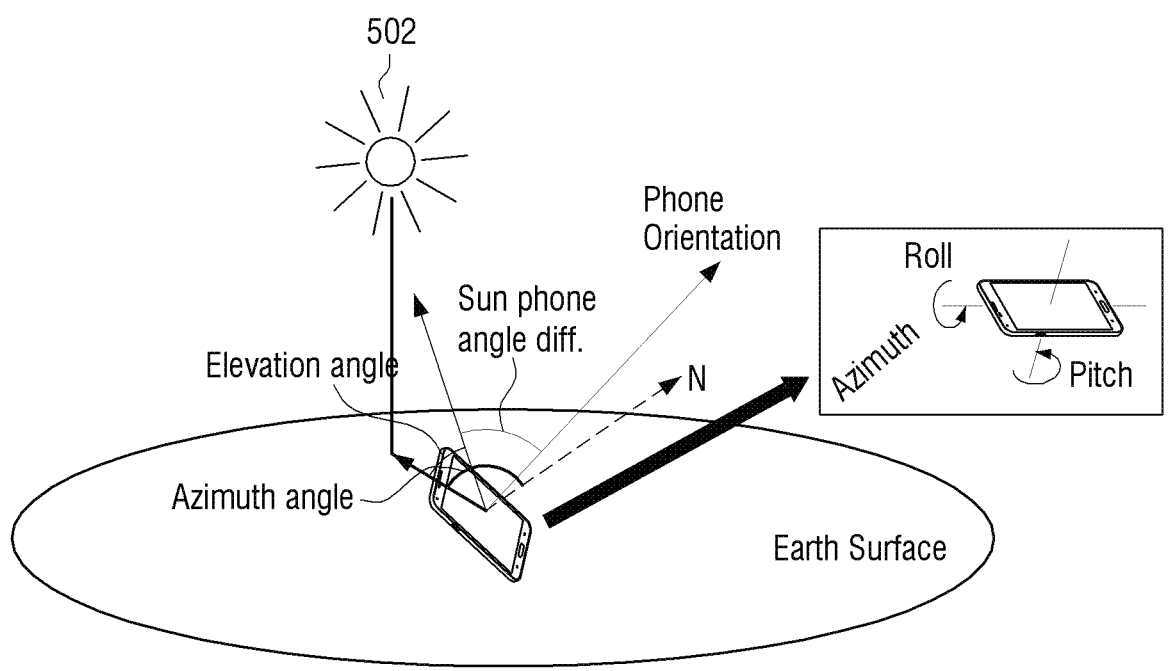
FIGS. 2A and 2B illustrate an example scenario in which an orientation of an electronic device with respect to a source of UV radiation is computed according to an example embodiment.
Figure 2B:
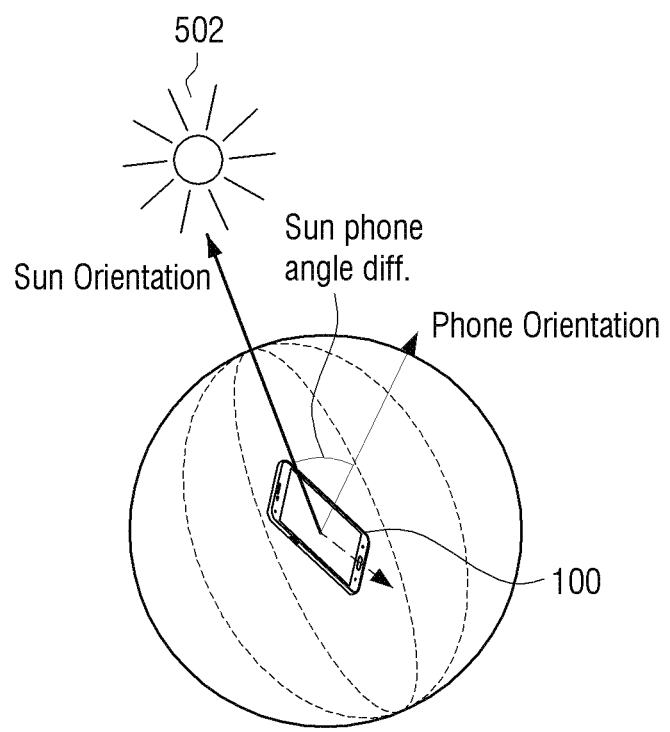

FIGS. 2A and 2B illustrate an example scenario in which an orientation of an electronic device with respect to a source of UV radiation, such as the sun, is computed, according to an example embodiment. For example, the position of the source, such as the position of the sun, may be defined by the elevation angle and the azimuth angle of the sun as shown in the FIG. 2A. Further, the orientation of the electronic device 100, such as the phone orientation, may be defined by a normal vector of the electronic device 100 surface as shown in the FIG. 2A.

Further, the controlled dataset and the un-controlled dataset may be captured over several days at different times of each day. As shown in the FIG. 2B, starting from the sun orientation, the electronic device 100 may be rotated 360 degrees following different paths. For each orientation, the angular difference between the electronic device 100 and sun is captured. Further, for each angular difference captured between the electronic device 100 and the sun, a graph showing the relationship between the angular difference and corresponding lux may be plotted, as shown in FIGS. 2C and 2D.

Figure 2C:
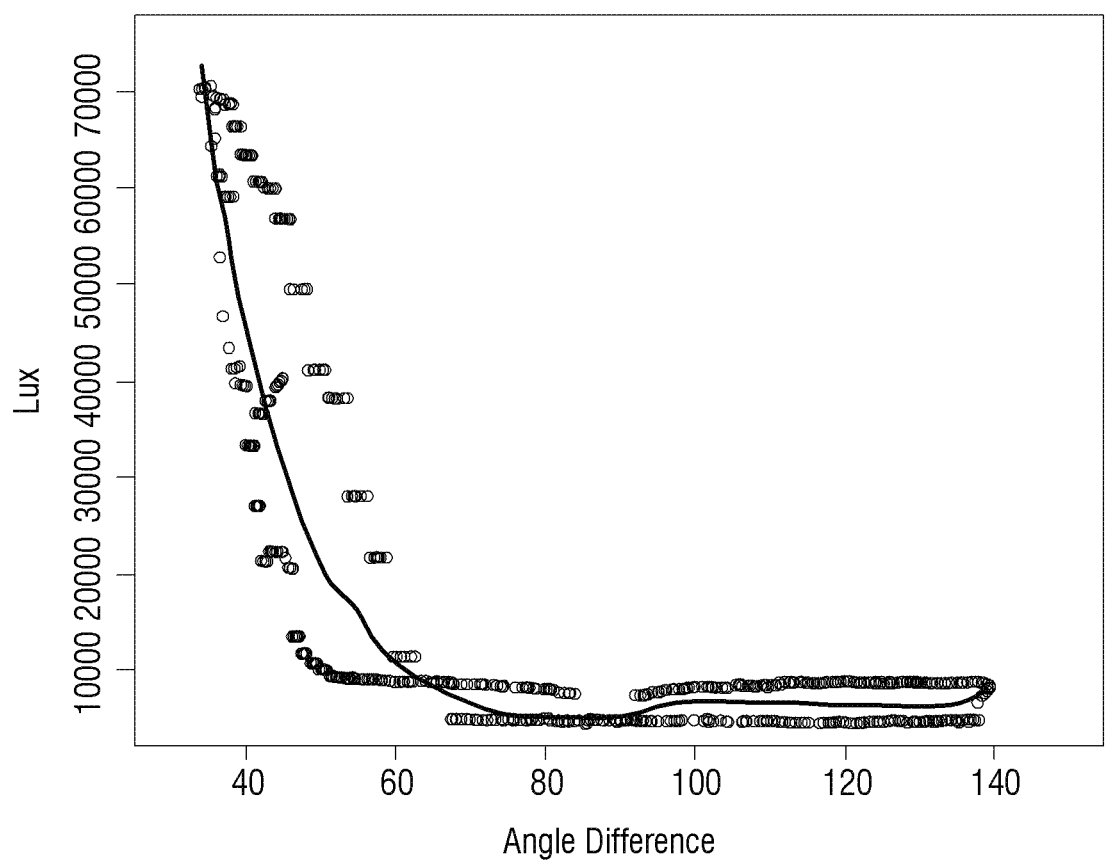
FIGS. 2C and 2D illustrate graphs showing variation of angular difference between an electronic device with respect to a source of UV radiation, and lux values according to an example.
Figure 2D:
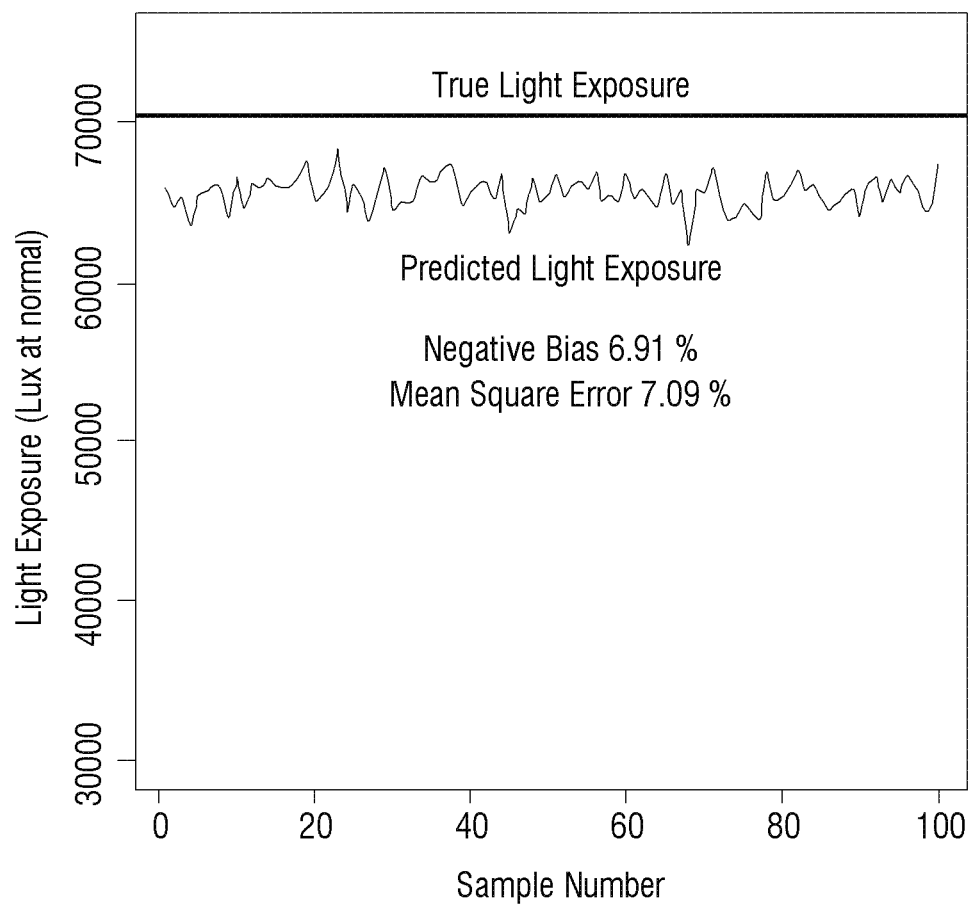

FIGS. 2C and 2D illustrate graphs showing variation of angular difference between the electronic device 100 with respect to a source of UV radiation, and the corresponding lux values according to an example embodiment. For each angular difference between the source of UV radiation, such as the sun, and the electronic device 100, the lux values are recorded by orienting the non-UV sensor 102 towards the source of the UV radiation. As shown in the graph in FIG. 2C, the lux value decreases as the value of the angular difference between the source of UV v and the electronic device 100 increases. In an example embodiment, the angular difference between the source of UV radiation and the electronic device 100, and the corresponding lux value are used as a training data set for the orientation invariant lux model.

As shown in the FIG. 2D, the training data set for the orientation invariant lux model may have sample number of data points. A number of iterations are performed to record the lux values corresponding to each of the angular difference between the source of the UV radiation, such as the sun, and the electronic device 100. Average lux measurement of each iteration are plotted. The top straight line as shown in the graph in FIG. 2D indicates the actual lux when the electronic device 100 is oriented towards the source of the UV radiation.

FIG. 3A is a flow chart 300*a* illustrating a method for determining the UVI from the recorded lux values according to an example embodiment. At step 302, the UVI is plotted against the recorded lux values. The processor 104 may be configured to plot the UVI against the recorded lux values.

At step 304, the method includes using the polynomial equation (4), to derive the co-efficient of the polynomial equation (2). The processor 104 may be configured to use the polynomial equation (2) to derive the co-efficient of the polynomial equation (2).

At step 306, the method includes using derived co-efficient (i.e., a, b, and c) to measure the UVI from the estimated lux. The processor 104 may be configured to use the derived co-efficient to measure the UVI. According to example embodiments, the second order polynomial may be used to lower the error rate. Further, for each lux value, a graph may be plotted between the UVI and the lux as shown in FIG. 3B.

FIG. 3B is a graph showing a relationship between the lux and the UVI according to an example embodiment. The UVI and the lux are correlated based on the polynomial equation (4). Further, the electronic device 100 may access the UVI under all weather conditions (e.g., cloudy, sunny and partly cloudy, or the like). A graph related to accessing the UVI is explained in conjunction with FIG. 3C.

Figure 3C:
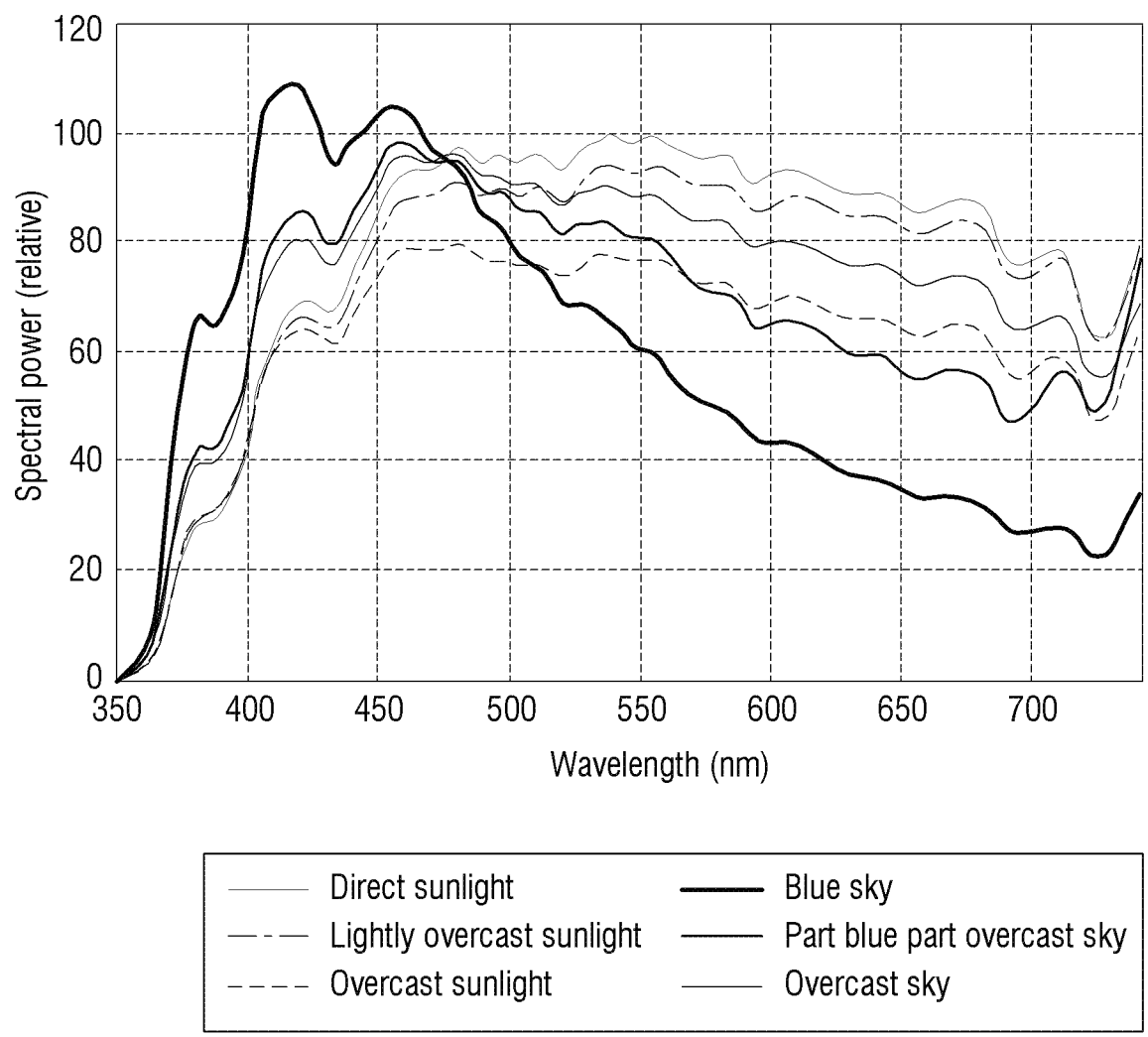
FIG. 3C illustrates a graph showing variation of wavelength and spectral power of UV exposure according to an example embodiment.

FIG. 3C is a graph showing variation of wavelength and spectral power of the UV exposure according to an example embodiment. As shown in the FIG. 3C, the UV exposure may be assessed under all weather conditions.

FIG. 4 is a flowchart illustrating a method 400 for recommending protective measures based on the determined UV dose according to an example embodiment. At step 402, the context of the electronic device 100 is determined. The processor 104 may be configured to determine the context of the electronic device 100. At step 404, the temporal smoothing of the context of the electronic device 100 is performed. The processor 104 may be configured to perform the temporal smoothing of the context of the electronic device 100. In an example embodiment, the context of the electronic device 100 may be determined based on at least one of a weather condition, visible light intensity threshold, location, and based on at least one parameter from the plurality of parameters.

At step 406, the method includes determining the radiation band based on the plurality of parameters. The processor 104 may be configured to determine the radiation band based on the plurality of parameters.

At step 408, the method includes determining the correlation between the radiation band and the UV exposure based on the correlation model and the context of the electronic device 100. The processor 104 may be configured to determine the correlation between the radiation band and the UV exposure based on the correlation model and the context of the electronic device 100.

At step 410, the method includes determining the UV dose based on the correlation. The processor 104 may be configured to determine the UV dose based on the correlation.

At step 412, the method includes recommending protective measures to the user. The processor 104 may be configured to recommend protective measures to the user. For example, the recommendation may include suggesting apparels, cosmetics, sunglasses, or the like.

The steps in the flow chart 400 may be performed in the order presented, in a different order, or simultaneously. Further, in example embodiments, some of the steps may be omitted, added, modified, skipped.

Figure 5:
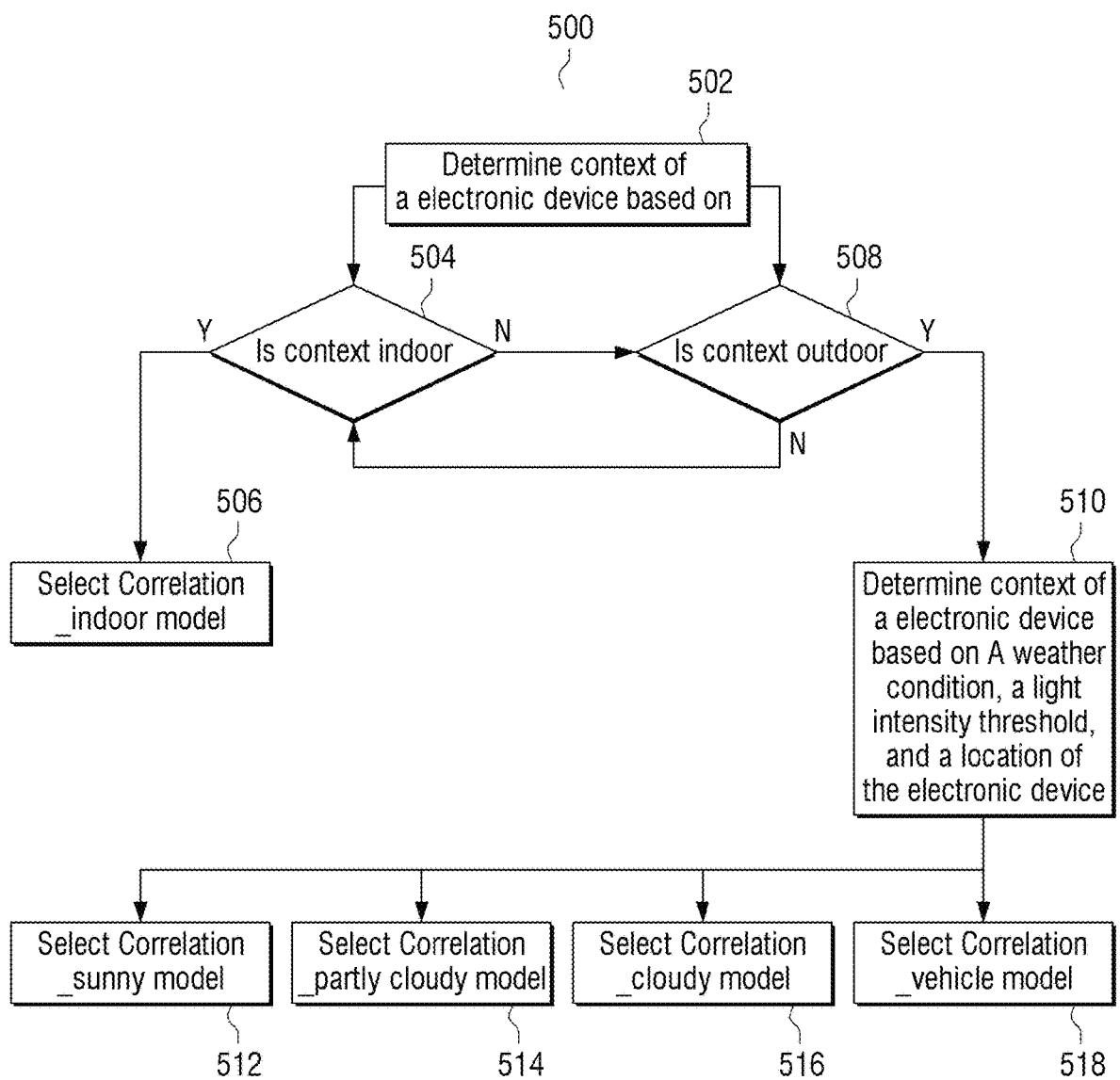
FIG. 5 illustrates a flowchart illustrating a method for selecting a correlation model based on a context of an electronic device according to an example embodiment.

FIG. 5 is a flow chart 500 illustrating a method for selecting a correlation model based on the context of the electronic device 100 according to an example embodiment. At step 502, the method includes determining the context of the electronic device 100. For example, the context of the electronic device 100 may be indoor or outdoor. The processor 104 may be configured to determine the context of the electronic device 100, wherein the context of the electronic device 100 is determined based on the at least one parameter from global positioning system (GPS) data, cell tower signal strength to which the electronic device 100 is connected to, GPS signal strength, data from the non-UV sensor 102, or the like.

In an example embodiment, the context of the electronic device 100 may be determined by an equation (3) as shown below:

$$Y_i = \log\frac{p(X_i)}{1 - p(X_i)} = \beta_0 + X_i^T \cdot \beta \quad (3)$$

where X is i/p GPS location or signal strength/pattern, Y is proportion of the context of the electronic device 100 (e.g., indoor or outdoor), and β is parameters to estimate which are measured offline on the training data. Further $$\beta = [\beta_1\ \beta_2\ \ldots\ \beta_m],$$

and $X_i = [x_{i,1}\ x_{i,2}\ \ldots\ x_{i,m}]$, where $x_{i,1}$, $x_{i,2}$ are GPS data, and $x_{i,2}\ \ldots\ x_{i,m}$ are other data or signal strength/pattern.

Further, maximum likelihood equation is shown in equation (4)

$$L(\beta_o, \beta | Y) = \mathrm{argmax}\prod_{i=1}^{n} p(X_i)^{Y_i} \cdot (1 - p(X_i))^{1-Y_i} \quad (4)$$

If it is determined, at step 504, that the context of the electronic device 100 is indoor then, at step 506, the method includes selecting the correlation model related to indoor (e.g., correlation indoor model). The processor 104 may be configured to select the correlation model related to indoor.

At step 504, if it is determined that the context of the electronic device 100 is not indoor then, at step 508, the method includes determining whether the context of the electronic device is outdoor. The processor 104 may be configured to determine whether the context of the electronic device 100 is outdoor. At step 508, if it is determined that the context of the electronic device 100 is outdoor then, at step 510, the method includes further determining the context of the electronic device 100 based on at least one of the weather condition, the light intensity threshold, and the location. The processor 104 may be configured to determine the context of the electronic device 100 based on at least one of the weather condition, the light intensity threshold, and the location. In an example embodiment, the processor 104 may receive motion related information from the accelerometer and lux from the light sensor to determine the context of the electronic device 100 based on at least one of the weather condition (e.g., open space sunny, open space partly cloudy, and open space cloudy) and the location of the electronic device 100 (e.g., in a vehicle).

The processor 104 may apply the equation (5) to determine the context of the electronic device 100 as shown below:

$$\Lambda_i = \log\frac{p'(K_i)}{1 - p'(K_i)} = \beta'_0 + K_i^T \cdot \beta' + Z, \quad (5)$$

Where K is i/p motion pattern, Z is function of light intensity, β' is parameters to estimate, and Λ is proportion of the context of the electronic device 100 (e.g., open sunny, open partly cloudy, open cloudy, and in the vehicle). Further, $$\beta' = [\beta'_1\beta'_2\ \ldots\ \beta'_m] \text{ and } K_i = [\kappa_{i,1}\kappa_{i,2}\ \ldots\ \kappa_{i,q}]$$

Further, maximum likelihood equation is shown in equation (6)

$$L(\beta'_0,\beta',v|\Lambda) = \arg\max(\int L(\beta'_o,\beta',v|\Lambda,Z)h(Z,\varepsilon)dZ), \quad (6)$$

Where $$L(\beta'_0, \beta', v | \Lambda, Z) = \prod_{i=1}^{n} p'(K_i)^{\Lambda_i} \cdot (1 - p'(K_i))^{1-\Lambda_i}, q$$

is number of features, and n is number of observations.

At step 510, if it is determined that the context of the electronic device 100 is open space sunny then, at step 512, the method includes selecting the correlation model related to open space sunny (e.g., Correlation sunny model). The processor 104 may be configured to select the correlation model related to open space sunny.

At step 510, if is it determined that the context of the electronic device 100 is open space partly cloudy then, at step 514, the method includes selecting a correlation model related to open space partly cloudy (e.g., Correlation_partly cloudy model). The processor 104 may be configured to select the correlation model related to open space partly cloudy.

At step 510, if it is determined that the context of the electronic device 100 is open space cloudy then, at step 516, the method includes selecting the correlation model related to open space cloudy (e.g., Correlation_cloudy model). The processor 104 may be configured to select the correlation model related to open space cloudy.

At step 510, if it is determined that the context of the electronic device 100 is in vehicle then, at step 518, the method includes selecting the correlation model related to vehicle (e.g., Correlation_vehicle model). The processor 104 may be configured to select the correlation model related to the vehicle.

At step 508, if it is determined that the context of the electronic device 100 is not outdoor then, at step 504, the method includes determining the context of the electronic device 100 as indoor.

The various steps in the flow chart 500 may be performed in the order presented, in a different order, or simultaneously. Further, in example embodiments, one or more of the steps may be omitted, added, modified, skipped, or the like.

Figure 6:
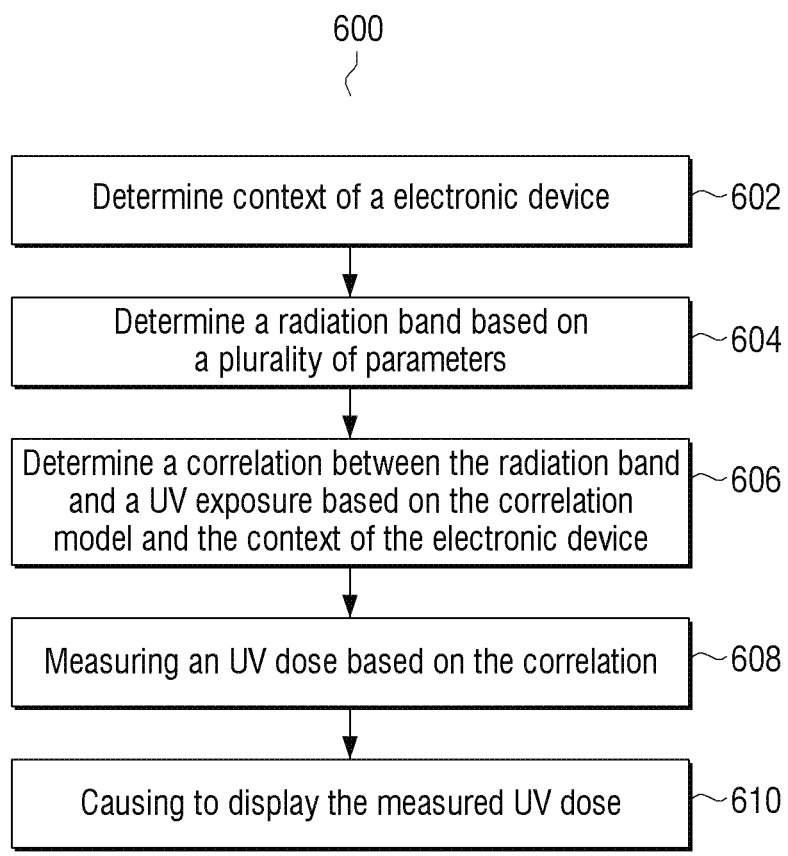
FIG. 6 illustrates a flowchart illustrating a method for determining a UV dose using at least one non-UV sensor according to an example embodiment.

FIG. 6 is a flowchart 600 illustrating a method for determining the UV dose using at least one non-UV sensor according to an example embodiment. At step 602, the method includes determining the context of the electronic device 100. The processor 104 may be configured to determine the context of the electronic device 100.

At step 604, the method includes determining the radiation band based on the plurality of parameters. The processor 104 may be configured to determine the radiation band based on the plurality of parameters.

At step 606, the method includes determining the correlation between the radiation band and the UV exposure based on the correlation model and the context of the electronic device 100. The processor 104 may be configured to determine the correlation between the radiation band and the UV exposure based on the correlation model and the context of the electronic device.

At step 608, the method includes measuring the UV dose based on the correlation between the radiation band and the UV exposure. The processor 104 may be configured to measure the UV dose based on the correlation. At step 610, the method includes causing to output the measured UV dose. The processor 104 may be configured to cause the measured UV dose to be output.

The various steps in the flow chart 500 may be performed in the order presented, in a different order, or simultaneously. Further, in example embodiments, one or more of the steps in the flow chart 500 may be omitted, added, modified, skipped, or the like.

Figure 7A:
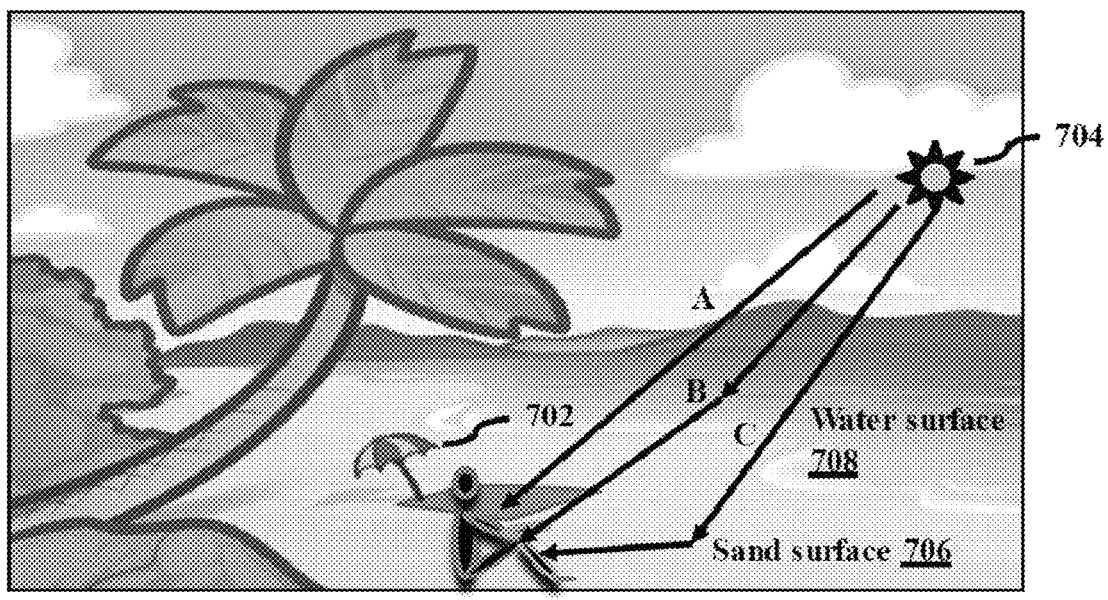
FIGS. 7A through 7E illustrate an example in which a UV dose/UV exposure is determined based on multiple reflections of UV radiation received from multiple surfaces according to an example embodiment.

FIGS. 7A through 7E illustrate example embodiments in which a UV dose/UV exposure is determined based on receiving multiple reflections of UV radiation from multiple surfaces. The multiple reflections of UV radiation from the multiple surfaces may occur on, for example, a beach. On the beach, the user 702 may be exposed to greater UV radiation due to the UV radiation from the sun being reflected from the water surface 708 and the sand surface 706. As reflected component of the UV radiation may not be a negligible amount, the reflected UV radiation may need to be incorporated when determining the UVI. Thus, the total UVI may have three components: direct exposure A, sand reflection C, and water reflection B, as illustrated in FIG. 7A.

Figure 7B:
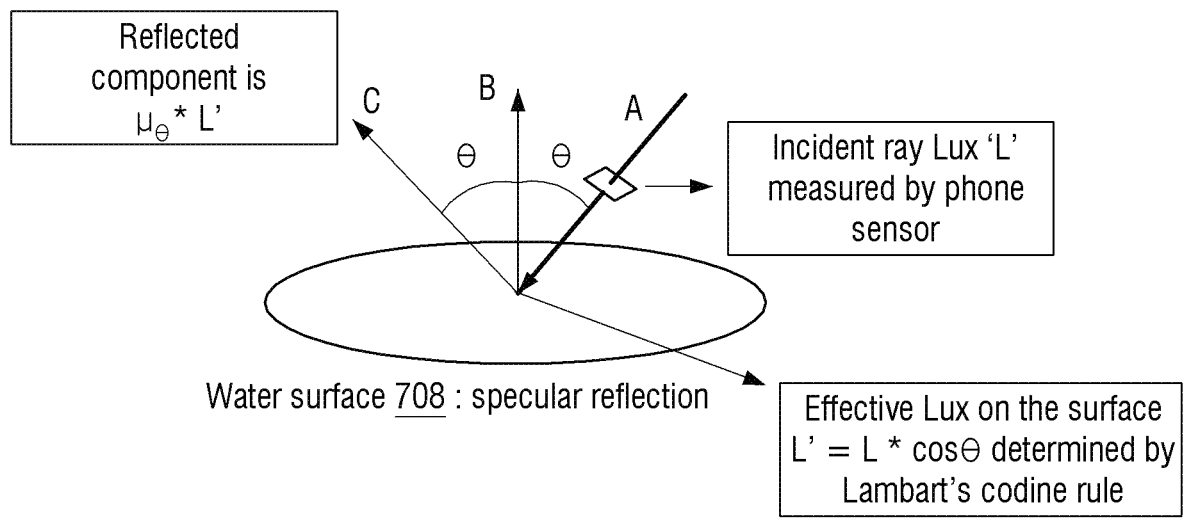

Further, the reflected component from the water surface 708 is shown in the FIG. 7B.

As shown in FIG. 7B, for an incident ray A, lux L may be measured by the non-UV sensor 102 (i.e., light sensor). The direction normal to the water surface 708 is shown as a vector B. Further, an effective lux L' on the water surface 708 may be determined. The effective lux L'=L*cos Θ. For example, the effective lux L' may be determined by Lambart's cosine rule.

Additionally, a UVI of a reflected component C from the water surface 708 may be determined. The UVI of the reflected component from the water surface 708 is $\mu_\Theta$*L'.

Figure 7C:
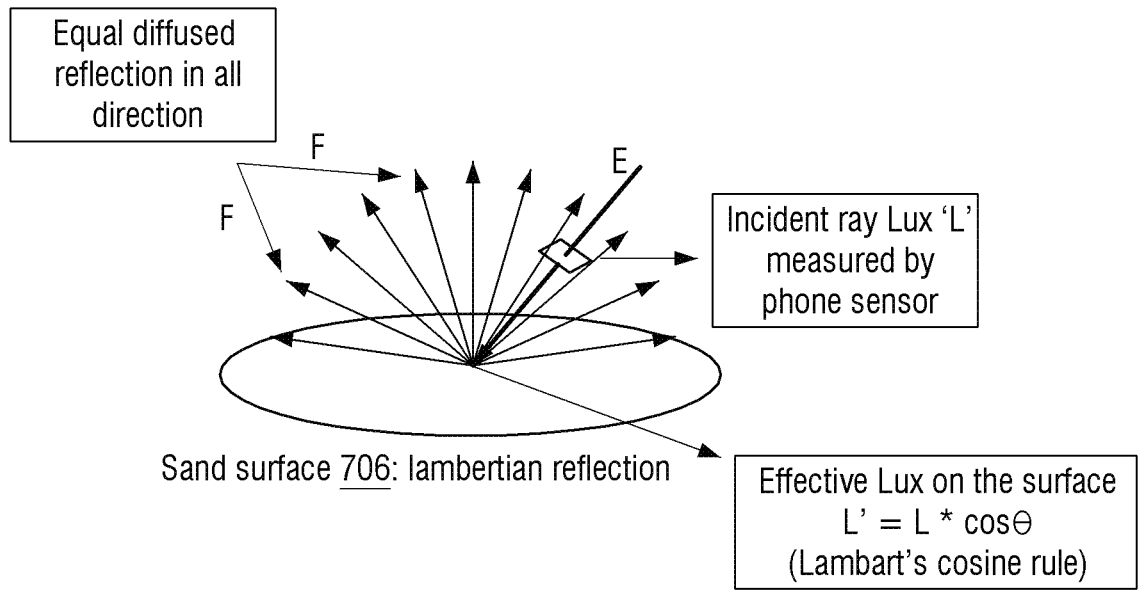

Further, the reflected components from the sand surface 706 is shown in the FIG. 7C. For the incident ray E, lux L may be measured by the non-UV sensor 102. Further, the effective lux L' on the sand surface 706 may be determined. The effective lux L'=L*cos Θ. For example, the effective lux is determined by Lambart's cosine rule. As shown in FIG. 7C, the user may experience an equally diffused reflection F in all directions from the sand surface 706.

Figure 7D:
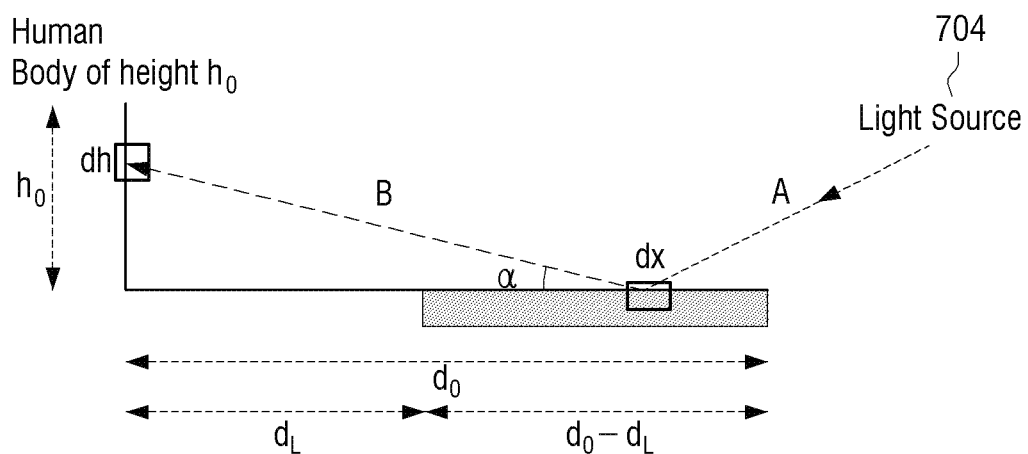

As shown in the FIG. 7D, a height $h_0$ of the user 702 may be considered. The user 702 may be positioned at a distance $d_L$ from the water surface 708. The effective radius around the user within which the light intensity affects the human body is $d_0$. Hence, the lux of visible light rays reflected from the water surface 708 has effective radius of $d_0$-$d_L$. Hence, the total exposure (I ($h_0$, $d_0$, $d_L$)) is given the equation (7):

$$\int_0^{2\Pi} \int_0^{d_L} \int_0^{\tan^{-1}\frac{h_0}{x}} \int_0^{h_0} \frac{\sin^2\alpha}{h^2} L_{land} dh d\alpha dx d\theta + \qquad (7)$$

$$\int_0^{\Pi} \int_{d_L}^{d_0} \int_0^{\tan^{-1}\frac{h_0}{x}} \int_0^{h_0} \frac{\sin^2\alpha}{h^2} L_{water} dh d\alpha dx d\theta$$

Figure 7E:
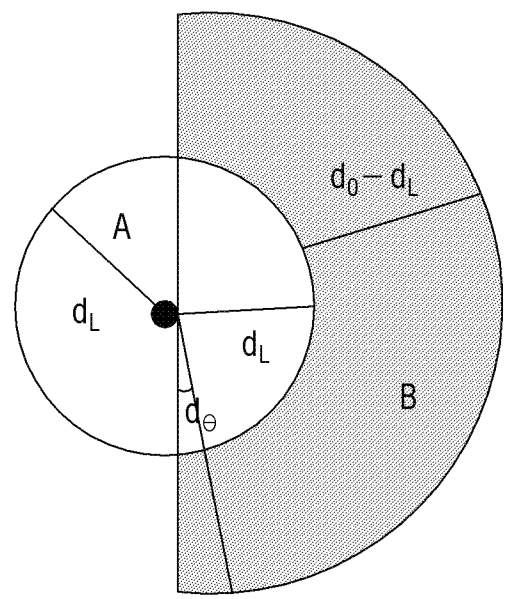

As shown in FIG. 7E, the circular region A indicates effective land surface 706 surrounding the user and the shaded region B indicates effective water surface 708.

Figure 8:
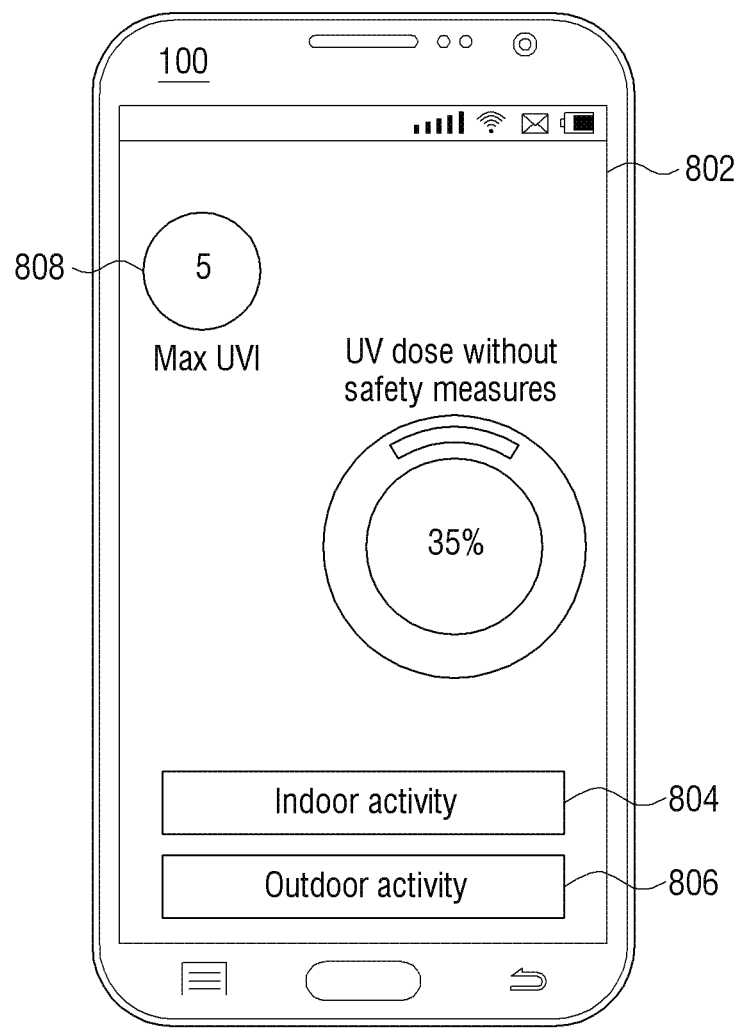
FIG. 8 illustrates a user interface (UI) of an electronic device displaying personalized UV dose based on the cumulative UV exposure according to an example embodiment.

FIG. 8 is a user interface (UI) of the electronic device 100 providing personalized UV dose based on the cumulative UV exposure according to an example embodiment. In an example embodiment, the cumulative UV exposure is determined based on equation (8):

$$CUVI = \int_{t=0}^{\tau_1} UVI_{indoor}(t, I)dt + \qquad (8)$$

$$\int_{t=0}^{\tau_2} UVI_{sunny}(t, I)dt + \int_{t=0}^{\tau_3} UVI_{moderate}(t, I)dt +$$

$$\int_{t=0}^{\tau_4} UVI_{cloudy}(t, I)dt + \int_{t=0}^{\tau_5} UVI_{vehicle}(t, I)dt$$

Where $C_{indoor}$ ( ) is correlation model indoor, $C_{moderate}$ ( ) is correlation model outdoor partly cloudy, $C_{vehicle}$ ( ) is correlation model inside vehicle, $C_{sunny}$ ( ) is correlation model outdoor sunny, $C_{cloudy}$ ( ) is correlation model outdoor cloudy, and I is the lux.

For example, based on inputs (e.g., the skin type, the weather condition, and the location) from the user, the electronic device 100 may display personalized cumulative UV exposure on the display 106. In an example embodiment, based on the inputs from the user, the electronic device 100 may output the personalized cumulative UV exposure. For example, if the electronic device 100 is located outdoor and maximum UVI 808 is considered, the user interface 802 of the electronic device 100 may display the personalized cumulative UV exposure, i.e., as 35% of the UV dose to be allowed without safety measures.

In addition, a user interface (UI) of the electronic device 100 may include icons 804 and 806 for setting indoor activities and outdoor activities.

Figure 9:
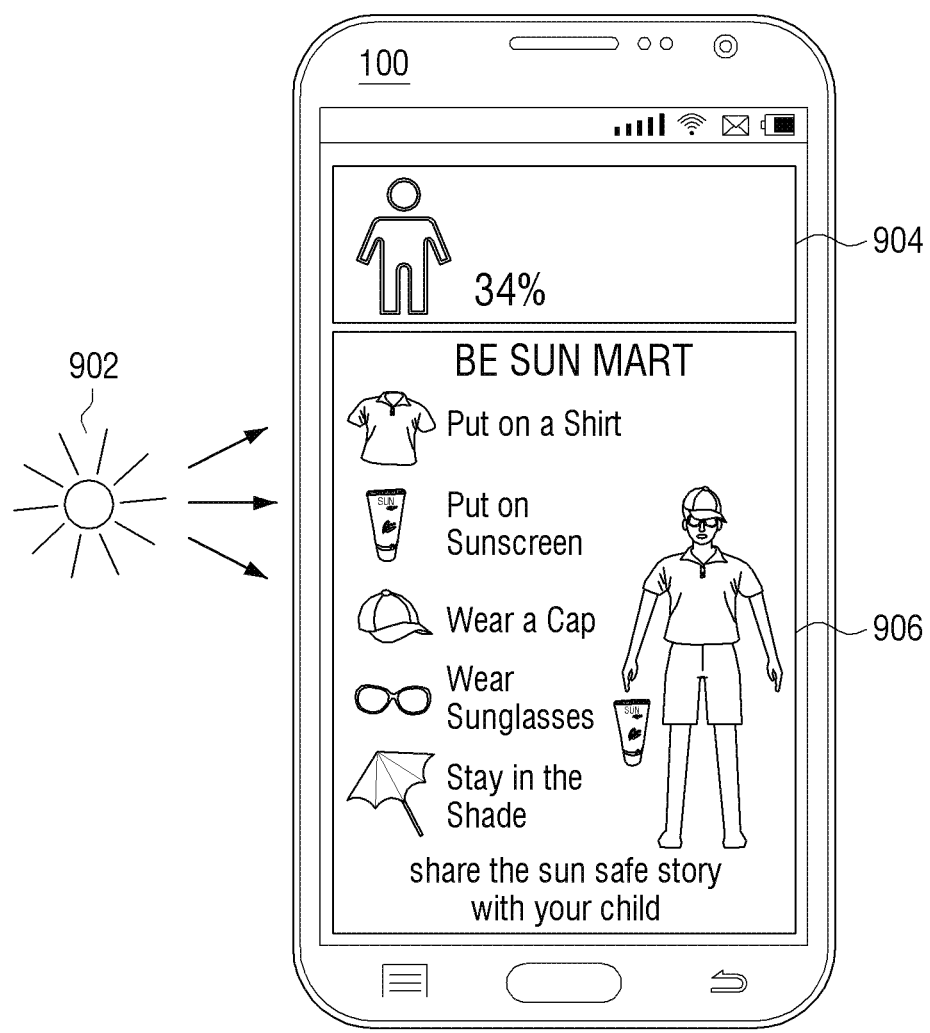
FIG. 9 illustrates a UI of an electronic device providing recommendations based on measured UV exposure according to an example embodiment.

FIG. 9 is the UI of the electronic device 100 providing recommendations based on measured UV exposure according to an example embodiment. The electronic device 100 may receive inputs 902 such as percentage of UV exposure, cumulative UV dose, and the weather condition from the user. Based on the user inputs, the electronic device 100 may display the percentage of UV exposure 904 and the recommendation 906 to the user for avoiding damage caused by the UV radiation. In an example embodiment, based on the user inputs, the electronic device 100 may provide an audio message related to the recommendation 906 to the user for avoiding damage caused by the UV radiation. The recommendation 906 may be provided when the percentage of UV exposure is greater than or equal to a predetermined value.

Figure 10:
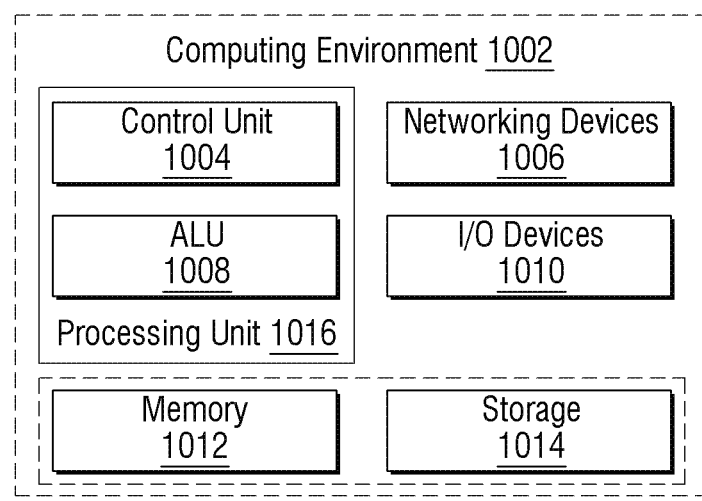
FIG. 10 illustrates a computing environment implementing the method for determining the UV dose in the electronic device according to an example embodiment.

FIG. 10 illustrates a computing environment implementing the method and system for determining the UV dose in the electronic device 100 according to an example embodiment. As shown in the FIG. 10, the computing environment 1002 may comprise at least one processing unit 1016 including a control unit 1004 and an arithmetic logic unit (ALU) 1008, a memory 1012, a storage unit 1014, plurality of networking devices 1006, and a plurality of input output (I/O) devices 1010. The processing unit 1016 may be configured to process the instructions for the method and system for determining the UV dose. The processing unit 1016 may be configured to receive commands from the control unit 1004 in order to perform its processing. Further, any logical and arithmetic operations involved in the execution of the instructions may be computed with the help of the ALU 1008.

The overall computing environment 1002 may be composed of multiple homogeneous or heterogeneous cores, multiple CPUs of different kinds, special media and other accelerators. The processing unit 1016 may be configured to process the instructions for the method and system for determining the UV dose. Further, the plurality of processing units 1016 may be located on a single chip or over multiple chips.

The scheme comprising of instructions and codes required for the implementation for the method and system for determining the UV dose are stored in either the memory unit 1012 or the storage 1014 or both. At the time of execution, the instructions may be fetched from the corresponding memory 1012 or storage 1714, and executed by the processing unit 1016.

Further, the storage 1014 may include non-volatile storage elements. Examples of such non-volatile storage elements may include magnetic hard discs, optical discs, floppy discs, flash memories, forms of electrically programmable memories (EPROM), and electrically erasable and programmable (EEPROM) memories. In addition, the storage 1014 may be considered a non-transitory storage medium. The term "non-transitory" may indicate that the storage medium is not embodied in a carrier wave or a propagated signal. However, the term "non-transitory" may not be interpreted as the storage 1014 is non-movable. In example embodiments, the storage 1014 may be configured to store larger amounts of information than the memory 1012. In example embodiments, a non-transitory storage medium may store data that may change over time (e.g., in random access memory (RAM) or cache).

In case of any hardware implementations, various networking devices 1006 or external I/O devices 1010 may be connected to the computing environment to support the implementation through the networking unit and the I/O device unit.

The processing unit 1016 may be configured to determine the context of the electronic device 100, obtain information of the ambient light using parameter sensed through the light sensor, estimate UV dose based on the context of the electronic device 100 and information of the ambient light of the electronic device 100, and control the display 114 to display information of the UV dose.

The processing unit 1016 may determine a correlation model to estimate UV dose based on the determined context. The determined context of the electronic device 100 may include information on whether the electronic device 100 is indoors, and information of weather of a region where the electronic device 100 is located. For example, the processing unit 1016 may determine whether the electronic device 100 is indoors through the parameter obtained from various sensors. When the electronic device 100 is indoors, the processing unit 1016 may select the first correlation model. When the electronic device 100 is outdoors, the processing unit 1016 may determine weather information of a region where the electronic device 100 is located, and select the second correlation model based on the determined weather information. For example, the processing unit 1016 may determine whether weather information of the region where the electronic device 100 is located is, for example, sunny, partly sunny, cloudy, partly cloudy, and select a correlation model corresponding to the determined weather information.

In addition, the processing unit 1016 may obtain information of a radiation band of the ambient light using a parameter sensed through the light sensor. For example, the processing unit 1016 may sense a position of the electronic device 100 from a sensor (for example, an accelerometer, a magnetometer, a gyroscope) to sense a position of the electronic device 100, obtain an angular difference between the electronic device 100 and the source of UV radiation, such as the sun, based on the sensed position of the electronic device 100, and obtain information of a radiation band of the ambient light based on the orientation invariant lux obtained through the light sensor.

In addition, the processing unit 1016 may determine correlation between the radiation band of the ambient light and UV rays based on the determined correlation model and estimate the UV dose based on the determined correlation.

In addition, the processing unit 1016 may provide personalized information of the UV dose based on information of skin type which is input from a user and UV dose.

The example embodiments disclosed herein may be implemented through at least one software program running on at least one hardware device and performing network management functions to control the elements. The elements shown in the FIGS. 1 through 10 include blocks which can be at least one of a hardware device, or a combination of hardware device and software components.

Example embodiments have been shown and described above. However, the exemplary embodiments are not limited thereto. Those skilled in the art may modify the example embodiments without departing from the gist and scope of the present disclosure as described by the appended claims, and their equivalents.

What is claimed is:

1. An electronic device comprising:
   a light sensor;
   a sensor configured to sense a position of the electronic device;
   a display; and
   a processor is configured to:
   determine a context of the electronic device, obtain information of ambient light using one or more parameters sensed by the light sensor, the information comprising an orientation invariant lux, obtain an angular difference between the electronic device and a UV source based on the position of the electronic device sensed by the sensor, obtain information of a radiation band of the ambient light based on the angular difference and the orientation invariant lux, estimate an ultraviolet (UV) dose based on the context of the electronic device and the information of the radiation hand of the ambient light, and control the display to display information of the UV dose.

2. The electronic device according to claim 1, wherein the processor is further configured to determine a correlation model to estimate the UV dose based on the context of the electronic device.

3. The electronic device according to claim 2, wherein the context of the electronic device comprises information on whether the electronic device is positioned indoors and information on weather of a region where the electronic device is positioned.

4. The electronic device according to claim 3, wherein the processor is further configured to:

determine whether the electronic device is positioned indoors or outdoors, in response to determining that the electronic device is positioned indoors, select a first correlation model, and in response to determining that the electronic device is positioned outdoors, determine weather information of the region where the electronic device is positioned and selects a second correlation model based on the weather information.

5. The electronic device according to claim 2, wherein the processor is further configured to:

determine correlation between the radiation band of the ambient light and UV rays emitted by the UV source based on the correlation model, and estimate the UV dose based on the correlation model.

6. The electronic device according to claim 1, wherein the processor is further configured to:

obtain information of a skin type of a user, and control the display to provide information of a personalized UV dose based on the information of the UV dose and the skin type.

7. A method of providing an ultraviolet (UV) dose of an electronic device, the method comprising:

determining a context of the electronic device;

sensing a position of the electronic device;

obtaining information of ambient light using one or more parameters sensed by a light sensor, the information comprising an orientation invariant lux;

obtaining an angular difference between the electronic device and a UV source based on the position of the electronic device sensed;

obtaining information of a radiation band of the ambient light based on the angular difference and the orientation invariant lux;

estimating a UV dose based on the context of the electronic device and the information of the radiation band of the ambient light; and displaying information of the UV dose.

8. The method according to claim 7, wherein the estimating the UV dose comprises determining a correlation model to estimate the UV dose based on the determined context of the electronic device.

9. The method according to claim 8, wherein the context of the electronic device comprises information on whether the electronic device is positioned indoors and information on weather of a region where the electronic device is positioned.

10. The method according to claim 9, wherein the determining the correlation model comprises:

determining whether the electronic device is positioned indoors or outdoors;

in response to determining that the electronic device is positioned indoors, selecting a first correlation model; and in response to determining that the electronic device is positioned outdoors, determining weather information of the region where the electronic device is positioned and selecting a second correlation model based on the determined weather information.

11. The method according to claim 10, wherein the estimating the UV dose comprises:

determining correlation between the radiation band of the ambient light and UV rays emitted from the UV source based on the correlation model; and estimating UV dose based on the determined correlation.

12. The method according to claim 7, further comprising:

obtaining information of a skin type of a user; and displaying information of personalized UV exposure based on the estimated UV dose and the information of the skin type.

13. An electronic device comprising:

a light sensor configured to sense ambient light;

a sensor configured to sense a position of the electronic device;

a display; and a processor configured to:

determine a context of the electronic device, obtain an orientation invariant lux of the ambient light based on one or more parameters of the ambient light sensed by the light sensor, obtain an angular difference between the electronic device and a UV source based on the position of the electronic device sensed by the sensor;

obtain information of a radiation band of the ambient light based on the angular difference and the orientation invariant lux;

estimate an ultraviolet (UV) dose based on the context of the electronic device and the orientation invariant lux and the radiation band of the ambient light, and control the display to display the UV dose.

14. The electronic device according to claim 13, wherein the processor is further configured to determine a lux measurement model to estimate the UV dose based on the context of the electronic device and the orientation invariant lux.

15. The electronic device according to claim 14, wherein a correlation between the orientation invariant lux and an ultraviolet intensity (UVI) is determined based on the lux measurement model.

16. The electronic device according to claim 15, wherein the processor is further configured to estimate the UV dose based on the correlation and the context of the electronic device.

* * * * *